(12) United States Patent
Liao et al.

(10) Patent No.: US 8,412,717 B2
(45) Date of Patent: *Apr. 2, 2013

(54) CHANGING RANKING ALGORITHMS BASED ON CUSTOMER SETTINGS

(75) Inventors: Ciya Liao, Fremont, CA (US); Thomas Chang, Redwood Shores, CA (US); Muralidhar Krishnaprasad, Redmond, WA (US); Meeten Bhavsar, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,688

(22) Filed: Jun. 27, 2011

(65) Prior Publication Data
US 2011/0258184 A1    Oct. 20, 2011

Related U.S. Application Data

(63) Continuation of application No. 11/769,245, filed on Jun. 27, 2007, now Pat. No. 7,996,392.

(51) Int. Cl.
G06F 7/00     (2006.01)
G06F 17/30    (2006.01)

(52) U.S. Cl. ........................................ 707/748

(58) Field of Classification Search .......... 707/748, 707/999.003
See application file for complete search history.

(56) References Cited

U.S. PATENT DOCUMENTS

| | | | |
|---|---|---|---|
| 5,493,677 A | 2/1996 | Balogh et al. | |
| 5,751,949 A | 5/1998 | Thomson et al. | |
| 5,845,278 A | 12/1998 | Kirsch et al. | |
| 5,884,312 A | 3/1999 | Dustan et al. | |
| 5,926,808 A | 7/1999 | Evans et al. | |
| 5,987,482 A | 11/1999 | Bates et al. | |
| 6,006,217 A | 12/1999 | Lumsden | |
| 6,012,053 A * | 1/2000 | Pant et al. | 1/1 |
| RE36,727 E | 6/2000 | Kageneck et al. | |
| 6,094,649 A | 7/2000 | Bowen et al. | |
| 6,182,142 B1 | 1/2001 | Win et al. | |
| 6,185,567 B1 | 2/2001 | Ratnaraj et al. | |
| 6,236,991 B1 | 5/2001 | Frauenhofer et al. | |
| 6,301,584 B1 | 10/2001 | Ranger | |
| 6,326,982 B1 | 12/2001 | Wu et al. | |
| 6,356,897 B1 | 3/2002 | Gusack | |
| 6,424,973 B1 | 7/2002 | Baclawski | |
| 6,631,369 B1 | 10/2003 | Meyerzon et al. | |
| 6,671,681 B1 | 12/2003 | Emens et al. | |

(Continued)

OTHER PUBLICATIONS

Alonso et al., Oracle Secure Enterprise Search 10g, An Oracle Technical White Paper, Mar. 2006, pp. 1-20, Oracle Corp., Redwood Shores, CA, US.

(Continued)

*Primary Examiner* — Aleksandr Kerzhner
(74) *Attorney, Agent, or Firm* — Kilpatrick Townsend & Stockton LLP

(57) ABSTRACT

Search term ranking algorithms can be generated and updated based on customer settings, such as where a ranking algorithm is modeled as a combination function of different ranking factors. An end user of a search system provides personalized preferences for weighted attributes, generally or for a single instance of the query. The user also can indicate the relative importance of one or more ranking factors by specifying different weights to the factors. Ranking factors can specify document attributes, such as document title, document body, document page rank, etc. Based on the attribute weights and the received user query, a ranking algorithm function will produce the relevant value for each document corresponding to the user preferences and personalization configurations.

20 Claims, 11 Drawing Sheets

U.S. PATENT DOCUMENTS

| | | |
|---|---|---|
| 6,678,683 B1 | 1/2004 | Shiiyama |
| 6,678,731 B1 | 1/2004 | Howard et al. |
| 6,711,568 B1 | 3/2004 | Bharat et al. |
| 6,734,886 B1 | 5/2004 | Hagan et al. |
| 6,735,585 B1 | 5/2004 | Black et al. |
| 6,754,873 B1 | 6/2004 | Law et al. |
| 6,757,669 B1 | 6/2004 | Adar et al. |
| 6,766,314 B2 | 7/2004 | Burnett |
| 6,826,597 B1 | 11/2004 | Lonnroth et al. |
| 6,847,977 B2 | 1/2005 | Abajian |
| 6,848,077 B1 | 1/2005 | McBrearty et al. |
| 6,865,608 B2 | 3/2005 | Hunter |
| 6,928,166 B2 | 8/2005 | Yoshizawa |
| 6,978,275 B2 | 12/2005 | Castellanos et al. |
| 7,031,954 B1 | 4/2006 | Kirsch |
| 7,100,207 B1 | 8/2006 | Prager |
| 7,110,983 B2 | 9/2006 | Shear et al. |
| 7,113,939 B2 | 9/2006 | Chou et al. |
| 7,136,876 B1 | 11/2006 | Adar et al. |
| 7,236,923 B1 | 6/2007 | Gupta |
| 7,257,577 B2 | 8/2007 | Fagin et al. |
| 7,287,214 B1 | 10/2007 | Jenkins et al. |
| 7,305,475 B2 | 12/2007 | Tock |
| 7,340,454 B2 | 3/2008 | Wu et al. |
| 7,370,381 B2 | 5/2008 | Tuttle et al. |
| 7,373,351 B2 | 5/2008 | Wu et al. |
| 7,437,351 B2 | 10/2008 | Page |
| 7,472,113 B1 | 12/2008 | Watson et al. |
| 7,493,301 B2 | 2/2009 | Palmon et al. |
| 7,584,120 B1 | 9/2009 | Yun et al. |
| 7,627,564 B2 | 12/2009 | Yao et al. |
| 7,636,714 B1 | 12/2009 | Lamping et al. |
| 7,640,196 B2 | 12/2009 | Weiss |
| 7,680,819 B1 | 3/2010 | Mellmer et al. |
| 7,711,676 B2 | 5/2010 | Stuhec |
| 7,716,243 B2 | 5/2010 | Schwartz et al. |
| 7,725,465 B2 | 5/2010 | Liao et al. |
| 7,743,064 B2 | 6/2010 | Faulkner et al. |
| 7,752,221 B2 | 7/2010 | Krishnaprasad et al. |
| 7,822,733 B2 | 10/2010 | Son |
| 7,941,419 B2 | 5/2011 | Bhatkar et al. |
| 7,970,791 B2 | 6/2011 | Liao et al. |
| 7,996,392 B2 | 8/2011 | Liao et al. |
| 8,005,816 B2 | 8/2011 | Krishnaprasad et al. |
| 8,027,982 B2 | 9/2011 | Ture et al. |
| 2001/0039563 A1 | 11/2001 | Tian |
| 2001/0042075 A1 | 11/2001 | Tabuchi |
| 2002/0099731 A1 | 7/2002 | Abajian |
| 2002/0103786 A1 | 8/2002 | Goel |
| 2002/0174122 A1 | 11/2002 | Chou et al. |
| 2002/0178394 A1 | 11/2002 | Bamberger |
| 2002/0184170 A1 | 12/2002 | Gilbert et al. |
| 2003/0014483 A1 | 1/2003 | Stevenson et al. |
| 2003/0051226 A1 | 3/2003 | Zimmer et al. |
| 2003/0055816 A1 | 3/2003 | Paine et al. |
| 2003/0065670 A1 | 4/2003 | Bisson et al. |
| 2003/0069880 A1 | 4/2003 | Harrison et al. |
| 2003/0074328 A1 | 4/2003 | Schiff et al. |
| 2003/0074354 A1 | 4/2003 | Lee et al. |
| 2003/0105966 A1 | 6/2003 | Pu et al. |
| 2003/0126140 A1 | 7/2003 | Engelhardt-Cronk et al. |
| 2003/0130993 A1 | 7/2003 | Mendelevitch et al. |
| 2003/0139921 A1 | 7/2003 | Byrd et al. |
| 2003/0177388 A1 | 9/2003 | Botz et al. |
| 2003/0204501 A1 | 10/2003 | Moon |
| 2003/0208547 A1 | 11/2003 | Branimir |
| 2003/0208684 A1 | 11/2003 | Camacho et al. |
| 2003/0220917 A1 | 11/2003 | Copperman et al. |
| 2004/0006585 A1 | 1/2004 | Paulus et al. |
| 2004/0041019 A1 | 3/2004 | Schneider et al. |
| 2004/0044952 A1 | 3/2004 | Jiang et al. |
| 2004/0062426 A1 | 4/2004 | Lo |
| 2004/0064340 A1 | 4/2004 | Johnston |
| 2004/0064687 A1 | 4/2004 | Pfitzmann et al. |
| 2004/0078371 A1 | 4/2004 | Worrall et al. |
| 2004/0088313 A1 | 5/2004 | Torres |
| 2004/0093331 A1 | 5/2004 | Garner et al. |
| 2004/0122811 A1 | 6/2004 | Page |
| 2004/0158527 A1 | 8/2004 | Lambert |
| 2004/0168066 A1 | 8/2004 | Alden |
| 2004/0199491 A1 | 10/2004 | Bhatt |
| 2004/0225643 A1 | 11/2004 | Alpha et al. |
| 2004/0230572 A1 | 11/2004 | Omoigui |
| 2004/0260685 A1 | 12/2004 | Pfleiger et al. |
| 2005/0004943 A1 | 1/2005 | Chang |
| 2005/0015381 A1 | 1/2005 | Clifford et al. |
| 2005/0015466 A1 | 1/2005 | Tripp et al. |
| 2005/0050037 A1 | 3/2005 | Frieder et al. |
| 2005/0060297 A1 | 3/2005 | Najork |
| 2005/0102251 A1 | 5/2005 | Gillespie |
| 2005/0108207 A1 | 5/2005 | Thuerk |
| 2005/0114226 A1 | 5/2005 | Tripp et al. |
| 2005/0114324 A1 | 5/2005 | Mayer |
| 2005/0119999 A1 | 6/2005 | Zait et al. |
| 2005/0154730 A1 | 7/2005 | Miller et al. |
| 2005/0187937 A1 | 8/2005 | Kawabe et al. |
| 2005/0210017 A1 | 9/2005 | Cucerzan |
| 2005/0216465 A1 | 9/2005 | Dutta et al. |
| 2005/0234859 A1 | 10/2005 | Ebata |
| 2005/0262050 A1* | 11/2005 | Fagin et al. .................. 707/3 |
| 2006/0023945 A1 | 2/2006 | King et al. |
| 2006/0036598 A1 | 2/2006 | Wu |
| 2006/0064411 A1 | 3/2006 | Gross et al. |
| 2006/0075120 A1 | 4/2006 | Smit |
| 2006/0080316 A1 | 4/2006 | Gilmore et al. |
| 2006/0123472 A1 | 6/2006 | Schmidt et al. |
| 2006/0129538 A1 | 6/2006 | Baader et al. |
| 2006/0136194 A1 | 6/2006 | Armstrong et al. |
| 2006/0136405 A1 | 6/2006 | Ducatel et al. |
| 2006/0167857 A1 | 7/2006 | Kraft et al. |
| 2006/0167860 A1 | 7/2006 | Eliashberg et al. |
| 2006/0195914 A1 | 8/2006 | Schwartz et al. |
| 2006/0212423 A1 | 9/2006 | Jones et al. |
| 2006/0224627 A1 | 10/2006 | Manikutty et al. |
| 2006/0229911 A1 | 10/2006 | Gropper et al. |
| 2006/0230022 A1 | 10/2006 | Bailey et al. |
| 2006/0271568 A1 | 11/2006 | Balkir et al. |
| 2006/0294077 A1 | 12/2006 | Bluhm et al. |
| 2007/0016583 A1 | 1/2007 | Lempel et al. |
| 2007/0016625 A1 | 1/2007 | Berstis |
| 2007/0061393 A1 | 3/2007 | Moore |
| 2007/0094210 A1 | 4/2007 | Craig et al. |
| 2007/0094710 A1 | 4/2007 | Walker et al. |
| 2007/0100915 A1 | 5/2007 | Rose et al. |
| 2007/0150515 A1 | 6/2007 | Brave et al. |
| 2007/0156669 A1 | 7/2007 | Marchisio et al. |
| 2007/0208712 A1 | 9/2007 | Krishnaprasad et al. |
| 2007/0208714 A1 | 9/2007 | Ture et al. |
| 2007/0208726 A1 | 9/2007 | Krishnaprasad et al. |
| 2007/0208734 A1 | 9/2007 | Koide et al. |
| 2007/0208744 A1 | 9/2007 | Krishnaprasad et al. |
| 2007/0208746 A1 | 9/2007 | Koide et al. |
| 2007/0209080 A1 | 9/2007 | Ture et al. |
| 2007/0214129 A1 | 9/2007 | Ture et al. |
| 2007/0220037 A1 | 9/2007 | Srivastava et al. |
| 2007/0220268 A1 | 9/2007 | Krishnaprasad et al. |
| 2007/0226695 A1 | 9/2007 | Krishnaprasad et al. |
| 2007/0250486 A1 | 10/2007 | Liao et al. |
| 2007/0276801 A1 | 11/2007 | Lawrence et al. |
| 2007/0283425 A1 | 12/2007 | Ture et al. |
| 2008/0086297 A1 | 4/2008 | Li et al. |
| 2008/0114721 A1 | 5/2008 | Jones et al. |
| 2008/0168037 A1 | 7/2008 | Kapadia et al. |
| 2008/0222138 A1 | 9/2008 | Liu et al. |
| 2009/0006359 A1 | 1/2009 | Liao |
| 2011/0246443 A1 | 10/2011 | Bhatkar et al. |
| 2011/0265189 A1 | 10/2011 | Liao et al. |

OTHER PUBLICATIONS

Article entitled "Dates," by Bootstrep, dated 2006, 1 pp.
Battat et al., Oracle Secure Enterprise Search 10g, One Search Across Your Enterprise Repositories, Mar. 2006, pp. 1-10, Oracle Corp., Redwood Shores, CA, US.
Booth et al. W3C Web Services Architecture, Feb. 2004, W3C, Table of Contents and Section 3.4.2.2, http://www.w3.org/TR/ws-arch/.
ComputerUser, Definition of "crawler," p. 1, www.computeruser.com.

Cyran et al., Oracle Secure Enterprise Search, Administrator's Guide, 10g Release 1 (10.1.6) B 19 2002-02, Mar. 2006, 136 pages.

Donghong et al. "Chinese Language IR based on Term Extraction," Proceedings of the Third NTCIR Workshop, National Institute of Informatics, pp. 1-3.

Hawking et al., "Efficient and Flexible Search Using Test and Metadata," CSIRO Mathematical and Information Sciences Technical Report 2000/83, May 2000, 13 pages.

IEEE, "The Authoritative Dictionary of IEEE Standards Terms," Dec. 2000, Standards Information Network IEEE Press, 7th Edition, pp. 1-4.

Larkey et al. "Acrophile: An Automated Acronym Extractor and Server," 2000, pp. 205-214.

Lee et al, "An Enterprise Intelligence System Integrating WWW and Intranet Resource," IN: Research Issues on Data Engineering: Information Technology for Virtual Enterprises, 1999. RIDE-VE '99. Proceedings, Ninth International Workshop on (1999). Available at: IEEE Xplore, 8 pages.

Okazaki, "Building an Abbreviation Dictionary Using a Term Recognition Approach," Bioinformatics, Oct. 18, 2006, pp. 1-7.

Okazaki, "Clustering acronyms in biomedical text for disambiguation," 2006, pp. 959-962.

Oracle Corporation, Oracle Database 10g, Oracle High Availability, Mar. 2006, pp. 1-12, Oracle Corp., Redwood Shores, CA, US.

Song et al., "An Application of Extended Stimulated Annealing Algorithm to Generate the Learning Data Set for Speech Recognition System," Copyright 2001, 5 pages.

Sun, "The Java Tutorials, Inheritance," 1995, A Sun Developer Network Site, pp. 1-5, http://java.sun.com/docs/books/tutorial /java/landl/subclasses.html.

Terada et al. "Automatic Expansion of Abbreviation by using Context and Character Information," Department of Computer Science, 2002, pp. 1-17.

Xu et al. "Using SVM to extract acronyms from text," Soft Comput, 2007, vol. 11, pp. 369-373.

U.S. Appl. No. 11/648,981, Final Office Action dated May 7, 2009, 16 pages.

U.S. Appl. No. 11/648,981, Non-Final Office Action dated Dec. 11, 2008, 13 pages.

U.S. Appl. No. 11/649,010, Final Office Action dated Apr. 17, 2009, 10 pages.

U.S. Appl. No. 11/649,010, Non-Final Office Action dated Nov. 7, 2008, 12 pages.

U.S. Appl. No. 11/649,010, Non-Final Office Action dated Oct. 2, 2009, 6 pages.

U.S. Appl. No. 11/649,010, Notice of Allowance dated Apr. 5, 2010, 7 pages.

U.S. Appl. No. 11/649,098, Final Office Action dated Feb. 19, 2010, 13 pages.

U.S. Appl. No. 11/649,098, Non-Final Office Action dated Jul. 24, 2009, 12 pages.

U.S. Appl. No. 11/680,510, Advisory Action dated Aug. 18, 2010, 3 pages.

U.S. Appl. No. 11/680,510, Advisory Action dated Dec. 1, 2009, 3 pages.

U.S. Appl. No. 11/680,510, Final Office Action dated Jun. 21, 2010, 13 pages.

U.S. Appl. No. 11/680,510, Final Office Action dated Sep. 18, 2009, 10 pages.

U.S. Appl. No. 11/680,510, Non-Final Office Action dated Apr. 2, 2009, 15 pages.

U.S. Appl. No. 11/680,510, Non-Final Office Action dated Jan. 12, 2010, 10 pages.

U.S. Appl. No. 11/680,510, Notice of Allowance mailed Apr. 14, 2011, 8 pages.

U.S. Appl. No. 11/680,530, Final Office Action dated Oct. 28, 2011, 31 pages.

U.S. Appl. No. 11/680,530, Advisory Action dated Sep. 8, 2010, 3 pages.

U.S. Appl. No. 11/680,530, Final Office Action dated Jul. 12, 2010, 24 pages.

U.S. Appl. No. 11/680,530, Non-Final Office Action dated Jul. 6, 2011, 27 pages.

U.S. Appl. No. 11/680,530, Non-Final Office Action dated Mar. 10, 2010, 25 pages.

U.S. Appl. No. 11/680,544, Final Office Action dated Jul. 19, 2010, 39 pages.

U.S. Appl. No. 11/680,544, Final Office Action dated Oct. 27, 2011, 50 pages.

U.S. Appl. No. 11/680,544, Non-Final Office Action dated Jul. 7, 2011, 38 pages.

U.S. Appl. No. 11/680,544, Non-Final Office Action dated Mar. 16, 2010, 29 pages.

U.S. Appl. No. 11/680,545, Final Office Action dated Oct. 26, 2011, 34 pages.

U.S. Appl. No. 11/680,545, Final Office Action dated Jul. 19, 2010, 33 pages.

U.S. Appl. No. 11/680,545, Non-Final Office Action dated Jul. 7, 2011, 29 pages.

U.S. Appl. No. 11/680,545, Non-Final Office Action dated Mar. 17, 2010, 27 pages.

U.S. Appl. No. 11/680,548, Advisory Action dated Jun. 16, 2011 2 pages.

U.S. Appl. No. 11/680,548, Advisory Action dated Jan. 4, 2010, 3 pages.

U.S. Appl. No. 11/680,548, Final Office Action date Apr. 13, 2011, 12 pages.

U.S. Appl. No. 11/680,548, Final Office Action date Oct. 13, 2009, 10 pages.

U.S. Appl. No. 11/680,548, Final Office Action dated Aug. 25, 2010, 12 pages.

U.S. Appl. No. 11/680,548, Non-Final Office Action dated Apr. 6, 2009, 13 pages.

U.S. Appl. No. 11/680,548, Non-Final Office Action dated Aug. 24, 2011, 10 pages.

U.S. Appl. No. 11/680,548, Non-Final Office Action dated Mar. 15, 2010, 11 pages.

U.S. Appl. No. 11/680,550, Non-Final Office Action dated Jun. 22, 2010, 13 pages.

U.S. Appl. No. 11/680,550, Advisory Action dated Apr. 2, 2010, 3 pages.

U.S. Appl. No. 11/680,550, Final Office Action dated Jan. 8, 2010, 13 pages.

U.S. Appl. No. 11/680,550, Non-Final Office Action dated Feb. 20, 2009, 11 pages.

U.S. Appl. No. 11/680,550, Non-Final Office Action dated Jul. 8, 2009, 12 pages.

U.S. Appl. No. 11/680,550, Notice of Allowance dated Jan. 4, 2011, 8 pages.

U.S. Appl. No. 11/680,556, Advisory Action dated Sep. 23, 2009, 3 pages.

U.S. Appl. No. 11/680,556, Final Office Action dated Dec. 22, 2010, 16 pages.

U.S. Appl. No. 11/680,556, Final Office Action dated Jul. 9, 2009, 11 pages.

U.S. Appl. No. 11/680,556, Non-Final Office Action dated Feb. 25, 2009, 7 pages.

U.S. Appl. No. 11/680,556, Non-Final Office Action dated Jan. 19, 2010, 11 pages.

U.S. Appl. No. 11/680,556, Non-Final Office Action dated Jul. 6, 2011, 17 pages.

U.S. Appl. No. 11/680,556, Non-Final Office Action dated Jul. 9, 2010, 12 pages.

U.S. Appl. No. 11/680,556, Notice of Allowance dated Nov. 17, 2011, 8 pages.

U.S. Appl. No. 11/680,558, Advisory Action dated Aug. 18, 2010, 3 pages.

U.S. Appl. No. 11/680,558, Advisory Action dated Dec. 17, 2009, 3 pages.

U.S. Appl. No. 11/680,558, Final Office Action dated Jul. 8, 2010, 12 pages.

U.S. Appl. No. 11/680,558, Final Office Action dated Oct. 9, 2009, 15 pages.

U.S. Appl. No. 11/680,558, Non-Final Office Action dated Apr. 14, 2009, 15 pages.

U.S. Appl. No. 11/680,558, Non-Final Office Action dated Apr. 26, 2011, 10 pages.
U.S. Appl. No. 11/680,558, Non-Final Office Action dated Feb. 17, 2010, 15 pages.
U.S. Appl. No. 11/680,558, Non-Final Office Action dated Sep. 12, 2011, 11 pages.
U.S. Appl. No. 11/680,559, Advisory Action dated Nov. 14, 2011, 3 pages.
U.S. Appl. No. 11/680,559, Advisory Action dated May 19, 2010, 3 pages.
U.S. Appl. No. 11/680,559, Advisory Action dated Jan. 28, 2011, 3 pages.
U.S. Appl. No. 11/680,559, Advisory Action dated Sep. 11, 2009, 3 pages.
U.S. Appl. No. 11/680,559, Final Office Action dated Aug. 29, 2011, 25 pages.
U.S. Appl. No. 11/680,559, Final Office Action dated Jul. 8, 2009, 21 pages.
U.S. Appl. No. 11/680,559, Final Office Action dated Mar. 18, 2010, 19 pages.
U.S. Appl. No. 11/680,559, Final Office Action dated Nov. 22, 2010, 23 pages.
U.S. Appl. No. 11/680,559, Non-Final Office Action dated Dec. 8, 2008, 34 pages.
U.S. Appl. No. 11/680,559, Non-Final Office Action dated Jun. 23, 2010, 19 pages.
U.S. Appl. No. 11/680,559, Non-Final Office Action dated Mar. 24, 2011, 25 pages.
U.S. Appl. No. 11/680,559, Non-Final Office Action dated Oct. 28, 2009, 18 pages.
U.S. Appl. No. 11/680,570, Advisory Action dated Dec. 17, 2009, 3 pages.
U.S. Appl. No. 11/680,570, Advisory Action dated Nov. 8, 2010, 3 pages.
U.S. Appl. No. 11/680,570, Final Office Action dated Oct. 9, 2009, 13 pages.
U.S. Appl. No. 11/680,570, Final Office Action dated Sep. 21, 2010, 12 pages.
U.S. Appl. No. 11/680,570, Non-Final Office Action dated Apr. 24, 2009, 17 pages.
U.S. Appl. No. 11/680,570, Non-Final Office Action dated May 14, 2010, 11 pages.
U.S. Appl. No. 11/680,570, Notice of Allowance mailed Jun. 8, 2011, 9 pages.
U.S. Appl. No. 11/680,571, Advisory Action dated Sep. 21, 2011, 2 pages.
U.S. Appl. No. 11/680,571, Advisory Action dated Jan. 27, 2011, 2 pages.
U.S. Appl. No. 11/680,571, Final Office Action dated Nov. 24, 2010, 10 pages.
U.S. Appl. No. 11/680,571, Non-Final Office Action dated Mar. 28, 2011, 9 pages.
U.S. Appl. No. 11/680,571, Final Office Action dated Jul. 13, 2011, 10 pages.
U.S. Appl. No. 11/680,571, Non-Final Office Action dated Aug. 11, 2010, 11 pages.
U.S. Appl. No. 11/680,571, Non-Final Office Action dated Dec. 5, 2011, 9 pages.
U.S. Appl. No. 11/737,091, Advisory Action dated Dec. 23, 2009, 3 pages.
U.S. Appl. No. 11/737,091, Final Office Action dated Oct. 16, 2009, 9 pages.
U.S. Appl. No. 11/737,091, Non-Final Office Action dated Apr. 9, 2009, 9 pages.
U.S. Appl. No. 11/737,091, Notice of Allowance dated Feb. 25, 2010, 4 pages.
U.S. Appl. No. 11/769,245, Advisory Action dated Sep. 13, 2010, 3 pages.
U.S. Appl. No. 11/769,245, Final Office Action dated Jul. 12, 2010, 10 pages.
U.S. Appl. No. 11/769,245, Non-Final Office Action dated Mar. 5, 2010, 9 pages.
U.S. Appl. No. 11/769,245, Non-Final Office Action dated Nov. 23, 2010, 10 pages.
U.S. Appl. No. 11/769,245, Notice of Allowance mailed May 23, 2011, 8 pages.
U.S. Appl. No. 11/770,011, Advisory Action dated Jun. 14, 2010, 3 pages.
U.S. Appl. No. 11/770,011, Advisory Action dated Jun. 17, 2011, 3 pages.
U.S. Appl. No. 11/770,011, Final Office Action dated Apr. 1, 2010, 28 pages.
U.S. Appl. No. 11/770,011, Final Office Action dated Apr. 14, 2011, 26 pages.
U.S. Appl. No. 11/770,011, Non-Final Office Action dated Jan. 3, 2011, 25 pages.
U.S. Appl. No. 11/770,011, Non-Final Office Action dated Jul. 21, 2010, 25 pages.
U.S. Appl. No. 11/770,011, Non-Final Office Action dated Sep. 28, 2009, 31 pages.
U.S. Appl. No. 12/751,268, Non-Final Office Action dated Nov. 15, 2010, 7 pages.
U.S. Appl. No. 12/751,268, Notice of Allowance dated Feb. 22, 2011, 9 pages.
U.S. Appl. No. 13/110,461, Non-Final Office Action dated Dec. 13, 2011, 6 pages.
U.S. Appl. No. 13/079,434, Non-Final Office Action dated Dec. 28, 2011, 7 pages.
Advisory Action for U.S. Appl. No. 11/680,544 mailed on Jan. 13, 2012, 3 pages.
Notice of Allowance for U.S. Appl. No. 11/680,559 mailed Mar. 6, 2012, 8 pages.
Final Office Action for U.S. Appl. No. 11/680,548 mailed Mar. 21, 2012, 11 pages.
Final Office Action for U.S. Appl. No. 11/680,571 mailed Mar. 29, 2012, 12 pages.
Notice of Allowance for U.S. Appl. No. 13/110,461 mailed Apr. 3, 2012, 5 pages.
Advisory Action for U.S. Appl. No. 11/680,548 mailed May 25, 2012, 3 pages.
Non-Final Office Action for U.S. Appl. No. 11/649,098 mailed on Jul. 23, 2012, 15 pages.
Notice of Allowance for U.S. Appl. No. 11/680,571 mailed on Aug. 15, 2012, 12 pages.

* cited by examiner

Fig. 8

Known Default Ranking Factors

In XML:
```
<default-factor>
<name>title</name>
<weight>VERY HIGH</name>
</default-factor>
```

Fig. 9

Unknown Custom Ranking Factors

In XML:
```
<custom-factor>
<attribute-name>category</attribute-name>
<factor-type>QUERY_FACTOR</factor-type>
<weight>LOW</weight>
</custom-factor>
```

FIG. 10
STATC_FACTOR
CUSTOMER SPECIFIED
a)ranking factor name, b) type, c)list of static values, and d) corresponding weights In XML:
```
<custom-factor>
<attribute-name>writing quality</attribute-name>
<factor-type>STATIC_FACTOR<factor type>
<match>
<value>VERY GOOD</value>
<weight>HIGH</weight>
</match>
<match>
<value>GOOD</value>
<weight>MEDIUM</weight>
</match>
<match>
<value>POOR</value>
<weight>LOW</weight>
</match>
</custom-factor>
```

CHANGING RANKING ALGORITHMS BASED ON CUSTOMER SETTINGS

CROSS-REFERENCES

This application is a continuation of U.S. patent application Ser. No. 11/769,245, filed Jun. 27, 2007, entitled "CHANGING RANKING ALGORITHMS BASED ON CUSTOMER SETTINGS", which has issued as U.S. Pat. No. 7,996,392, which is hereby incorporated by reference in its entirety for all purposes.

BACKGROUND OF THE INVENTION

Embodiments of the present invention relate to systems and methods for generating query results, as well as to information management systems for use with heterogeneous enterprise and other environments that may include relational database structured data and unstructured data stored in document images. Embodiments also relate to methods of searching secure data repositories that contain documents or other data items belonging to numerous heterogeneous enterprise environments, as well as methods of changing a customer-specified setting to rank results in a query in an enterprise search system able to crawl heterogeneous enterprise content.

Typically in an enterprise relational database, query generators are used to construct database queries which are then sent to a database for execution. A user constructs a query by an approach such as selecting items from a drop down list of items displayed on an interface. The items may represent data or documents which are to be obtained from a database or using a URL, or alternatively the items may represent operations that are to be performed on the data. Once the items have been selected, the query generator then generates a query, usually in Structured Query Language (SQL), for execution by the database.

An end user in an enterprise environment frequently searches huge databases. Information retrieval systems in such environments are traditionally judged by their precision and recall. Large databases of documents, such as the World Wide Web, contain many low quality documents. As a result, searches across these databases typically return hundreds of irrelevant or unwanted documents which camouflage the few relevant ones that meet the personalized needs of an end user. In order to improve the selectivity of the results, common techniques allow an end user to modify the search, or to provide additional search terms. These techniques are most effective in cases where the database is homogeneous and already classified into subsets, or in cases where the user is searching for well known and specific information. In other cases, however, these techniques are often not effective.

A typical enterprise has a large number of sources of data and many different types of data. In addition, some data may be connected to proprietary data networks, while other data sources may be connected to, and accessible from, public data networks, such as the Internet. More particularly, information within a single enterprise can be spread across Web pages, databases, mail servers or other collaboration software, document repositories, file servers, and desktops. As the number of documents accessible via an enterprise intranet or the Internet grows, the number of documents that match a particular query becomes unmanageable. Previous approaches for prioritizing searches have involved keyword priorities and pairs of keywords leading to some improvement although not every document matching the query is likely to be equally important from the user's perspective. A user may still be overwhelmed by an enormous number of documents returned by a search engine, unless the documents are ordered based on their relevance to the user's specific query and not merely limited to keywords or pairing of keywords. Another problem is that differing deployments in a heterogeneous enterprise environment may want to emphasize different document attributes, creating a difficult task for a user attempting to return results from such a document. Often, the results of such a search will be that the desired document hit is at the end of several pages of results.

One way to order documents is to create a page rank algorithm. Many search engines also provide a relevance ranking, which is a relative numerical estimate of the statistical likelihood that the material at a given URL will be of interest in comparison to other documents. Relevance rankings are often based on the number of times a keyword or search phrase appears in a document, its placement in the document and the size of the document. However, in the context of differing attributes for the same document in a heterogeneous enterprise environment, such relevance ranking tools do not offer an end user the desired level of configurability and customization.

Ranking functions that rank documents according to their relevance to a given search query are known, and while useful in some settings, do not allow a consistent user in a heterogeneous enterprise environment to personalize ranking results based on an end user set of preferences, either globally or for a single instance. Therefore, efforts continue in the art to develop ranking functions that provide better search results for a given search query compared to search results generated by search engines using known ranking functions. The ability to allow an enterprise end user to change ranking functions to customize the ranking of query results returned in heterogeneous enterprise environment to return personalized rankings of content for a single instance within the enterprise has remained unsolved.

Therefore it is desirable to provide a simple, intuitive, and heuristic method to allow an end user to change ranking algorithms to meet global or single instance requirements in a heterogeneous enterprise environment query, as well as to allow end users to rank search results in heterogeneous enterprise environments. It is desirable to provide a system that overcomes the above and other problems.

BRIEF SUMMARY OF THE INVENTION

Systems and methods in accordance with various embodiments of the present invention can provide for the generation and updating of ranking algorithms for queries and search results based on at least one customer setting, such as for a heterogeneous enterprise environment.

In one embodiment, a set of ranking factors is obtained that is to be applied to search results for a received user query. These ranking factors can be classified using a first classification for each ranking factor based on whether the ranking factors are default factors or custom factors. The ranking factors also can be classified using a second classification for each of the ranking factors based on whether the ranking factors depend upon the user query.

Depending upon the classifications, different attributes can be specified by the user, such as weights for each ranking factor and name information for custom ranking factors. When a user query is received, a ranking algorithm is generated that is specific for that user, and that can be specific for that user query as matching can activate various query-dependent factors. The ranking algorithm then is a combination function of the ranking factors that apply to the received query. The ranking algorithm then is applied to search results for the user query. The search results are then displayed ranked according to the user-supplied weights.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 8 further illustrates an exemplary implementation of a known default ranking factor.

FIG. 9 further illustrates an exemplary implementation of unknown custom ranking factors that require an end user to define the type of ranking factor as either query factor or static factor.

FIG. 10 further illustrates a second exemplary implementation of a static factor.

DETAILED DESCRIPTION OF THE INVENTION

Figure 1:
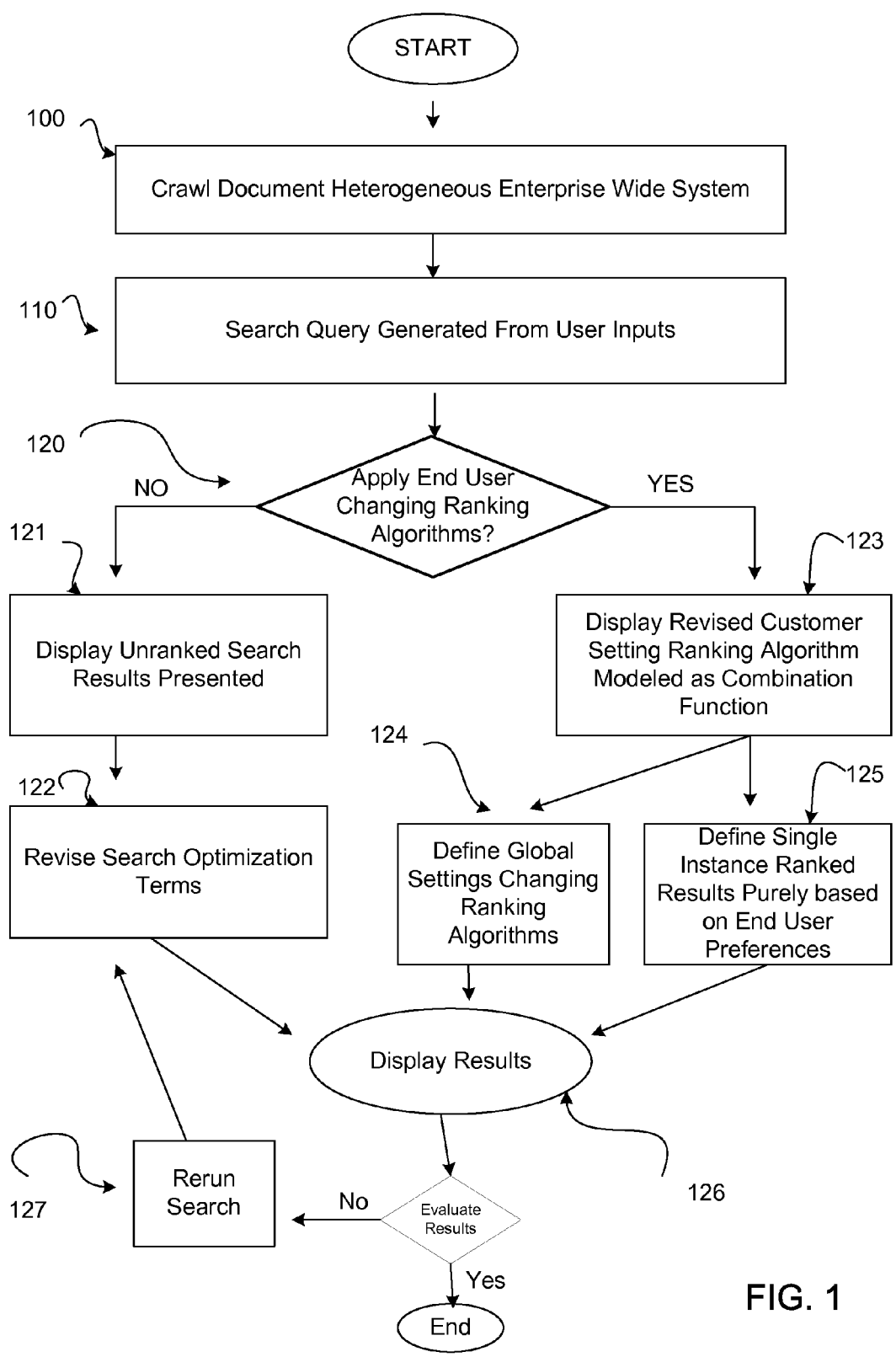
FIG. 1 illustrates a ranking algorithms change overall process.

Systems and methods in accordance with various embodiments of the present invention can overcome the aforementioned and other deficiencies in existing search approaches by providing for the changing of ranking algorithms based on at least one customer setting, globally or in a single instance of a heterogeneous enterprise environment, for example.

In one embodiment, a ranking algorithm is modeled as a combination function of different ranking factors. An end user of a search system may subscribe to a template in a query application interface by providing personalized preferences as to weighted attributes for the single instance of the query. The end user can, for example, indicate the relative importance of one or more ranking factors, such as by specifying different weights for the factors. The ranking factors in one embodiment specify document attributes, such as document title, document body, document page rank, etc. Based at least in part on the attribute weights and a query, a single instance ranking function will produce a relevant value for each document in accordance with these end user preferences and personalization configurations.

In one embodiment, a ranking algorithm utilizes ranking factors that are classified in two ways. First, ranking factors are classified based on whether the factors are known to the search system. For example, ranking factors are classified as "default" factors if those factors are known to the search system. Factors that are unknown to the search system are classified as "custom" factors. For example, "title" can be classified as a default factor which corresponds to a general attribute known to the search system. An attribute such as "category" can be classified as a custom attribute that corresponds to a special attribute that is only in effect in a system that is able to categorize documents.

Secondly, ranking factors in this embodiment are classified based on whether the effects of the ranking factors are dependent on the query. A query-dependent ranking factor can be classified as a "query" factor, while a query-independent ranking factor can classified as a "static" factor. These classification names are, or course, exemplary, and can include any other appropriate classification.

A query factor then will become effective only when a particular query matches the corresponding attribute. For example, a query factor will become active if terms in a user query match a value of at least one query dependent ranking factor in a candidate document. If the query factor is active, that query factor will be used to modify document attribute weighting factors, which will affect the ranking of displayed query results.

In one embodiment, a static factor will always be effective. The importance of a static factor to the ranking function, however, will be based on the value of the corresponding document attribute. For example, each document can be given a static value from "VERY GOOD" or "GOOD" to "POOR" based on "writing quality". In this case, the name of static factor is 'writing quality' and it has three values: "VERY GOOD", "GOOD", and "POOR". Each value will correspond to a different weight based on the individual single instance preferences of the end user. Based on the value of a document writing quality, the document will be treated differently in the ranking function algorithm according to the end user weight value assigned to "writing quality".

In one embodiment, ranking factor weights are assigned into seven classes. A class value can be (empty): using default weight; NONE: wherein the system will not use this factor in ranking query; VERY HIGH; HIGH; MEDIUM; LOW; or VERY LOW. When the values are from "VERY LOW" to "VERY HIGH", the corresponding ranking factor will be considered by the ranking function in a measured importance varying from very low to very high.

According to another aspect of the present invention, known default ranking factors only require an end user to specify ranking factor name and weight. For example, in XML: "<default-factor><name>title</name></default-factor>".

According to another aspect of the present invention, unknown custom ranking factors require an end user to define the type of ranking factor (e.g., as a query factor or static factor). For a query factor, an end user only needs to specify ranking factor name, type, and weights. For example, in XML: "<custom-factor><attribute-name>category</attribute-name><factor-type>QUERY_FACTOR</factor-type><weight>LOW</weight></custom-factor>."

According to another aspect of the present invention, for a static factor an end user only needs to specify ranking factor name, type, the list of static values, and corresponding weights. For example, in XML:

```
<custom-factor>
    <attribute-name>writing quality</attribute-name>
    <factor-type>STATIC_FACTOR</factor-type>
    <match><value>VERY_GOOD</value>
        <weight>MEDIUM</weight></match>
    <match><value>POOR</value><weight>LOW</weight></match>
</custom-factor>
```

The ranking factor specification can be set by customers to be effective for the whole search system, or the ranking factors specification can be submitted with each query and then impact ranking function differently for each query.

FIG. 1 illustrates a method 100 for searching across an enterprise in accordance with one embodiment. In this method, documents across a heterogeneous enterprise wide system are crawled 105 initially to build up a document index. A crawler component can crawl and search a variety of sources across an enterprise, regardless of whether the sources conform to a conventional user role model. In a heterogeneous enterprise wide environment, sources may represent the same document in differing ways to highlight a plurality of attributes leading to difficulties to rank results. A user then can configure or generate a search query using various user inputs 110. When a query is received, a check can be made to determine whether there are changing ranking algorithms to be applied 120, which can allow for a more current and personalized result list than can be obtained from static queries.

If there are no end user changing ranking algorithms to apply, default ranking algorithms can be applied, such as those found in a standard Web browser, whereby unranked search results are generated and presented to the user submitting the query 121. Unranked search results can be complicated when the same document may yield different results when searched in different applications, a common problem in a heterogeneous enterprise environment. As a result, the end user can be forced to adjust keywords multiple times to revise and optimize a search or search terms 122 until the desired query search results are displayed 126. Such an approach also can result in the user rerunning the search 127, in a trial and error methodology, which is inefficient, costly and slow.

If, however, there is an active changing ranking algorithm to apply to the query, the changing ranking algorithm can be generated and/or revised using a combination function 123 as discussed elsewhere herein. The algorithm can be defined using global settings 124 or for single instance ranked results based on the user preferences 125. A result based on end user preferences is obtained from a heterogeneous enterprise environment and displayed to the user submitting the query 126. The algorithms, and thus the results, can be tuned and optimized by updating the combination function to more accurately reflect user preferences. Also, changed ranking results can be tuned and optimized for each single instance of query results displayed or via an administrator or user's global settings preferences by changing ranking algorithms utilizing user feedback to match the desired returned results from a query single instance. The results can be evaluated and, if necessary, the search can be rerun 127.

Figure 2:
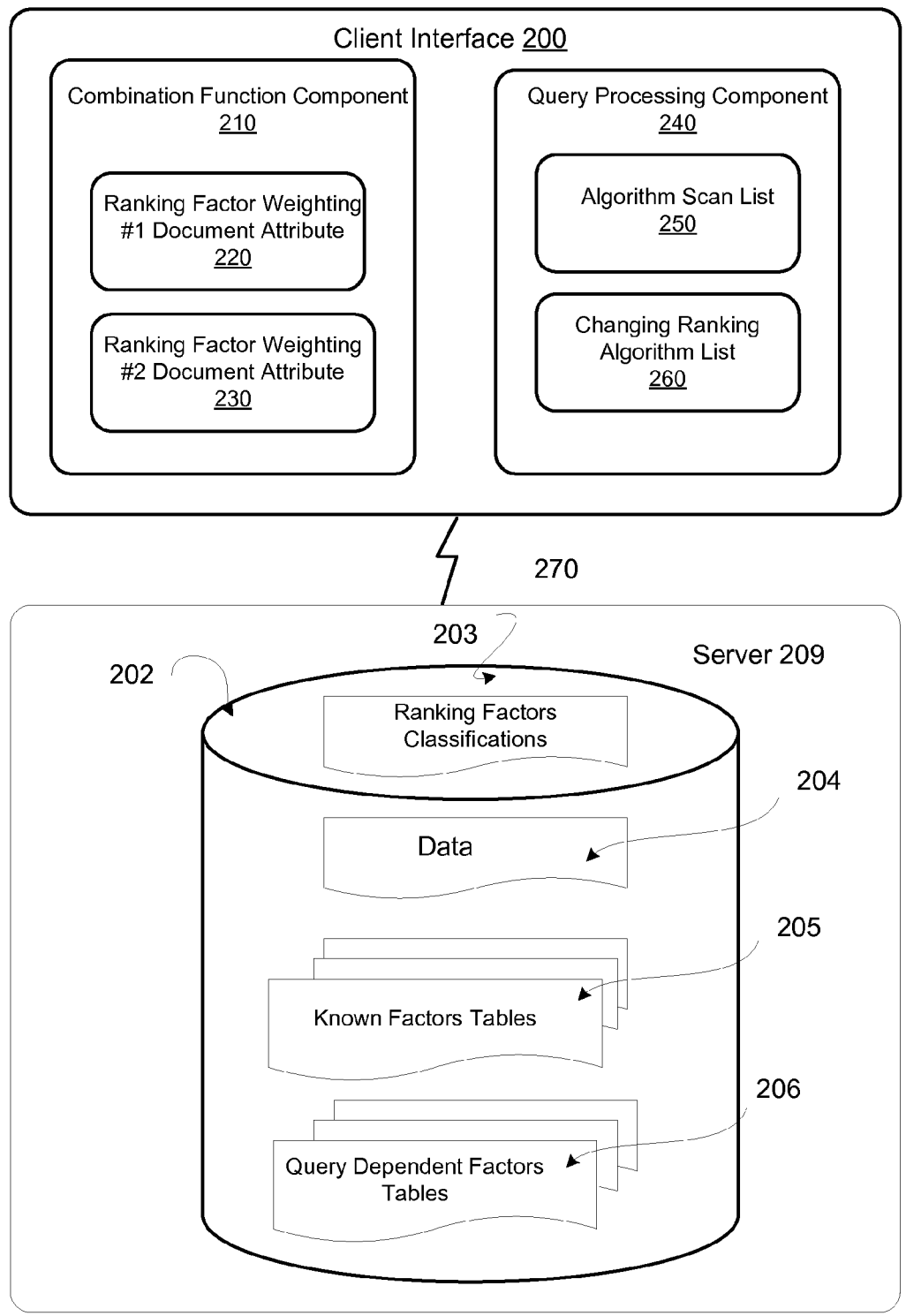
FIG. 2 illustrates linking a combination function and query processing component of a client computer to a set of ranking factors classifications tables in a heterogeneous enterprise environment system.

FIG. 2 shows part of a system for implementing such an approach. In order to change ranking algorithms based on a customer setting, a ranking algorithm is modeled using a combination function component 210 that utilizes different ranking factors 220, 230 in an exemplary client interface 201 of an end user computer system 200. The importance of various ranking factors may be defined by specifying different weights to the factors 221, 231. The ranking factors specify document attributes, such as document title, document body, document page rank, etc. Based on the attribute weights and query, a single instance combination ranking function 210 communicatively coupled to a query processing component 240 will produce the relevant value for each document in accordance with the end user preferences and personalization configurations stored with data 204 in the database 202 to be delivered to a server computer communicatively coupled to a heterogeneous enterprise environment. An end user of the search system may subscribe to a template in the query application component interface 241 by providing personalized preferences to weighted attributes 221, 231 for the single instance of the query communicated in the enterprise environment 270. Weighted attribute factor tables 205, 206 allow an end user to perform personalized tasks to change ranking algorithms according to end user preferences and communicate the changing ranking results to the heterogeneous enterprise environment. 270.

Ranking factors may be classified in two ways. FIG. 2 illustrates a ranking factor classification system 200 comprising generally a client interface 201 and a computer system server 209. A data storage system 202 of the server is comprised of a data repository 204 and further configured with known factors tables 205 and query dependent factors tables 206 to facilitate search of structured data. The client interface 201 includes a graphical display device, a plurality of screen configurations to display query results and data, and a means of data entry. An end user can utilize the ranking factors classification system to structure data according to a plurality of changed algorithms 260 selected from an algorithm scan list 250 to rank the desired query results. The database 202 further structures factors in tables for known factors 205 and query dependent factors 206.

Figure 3:
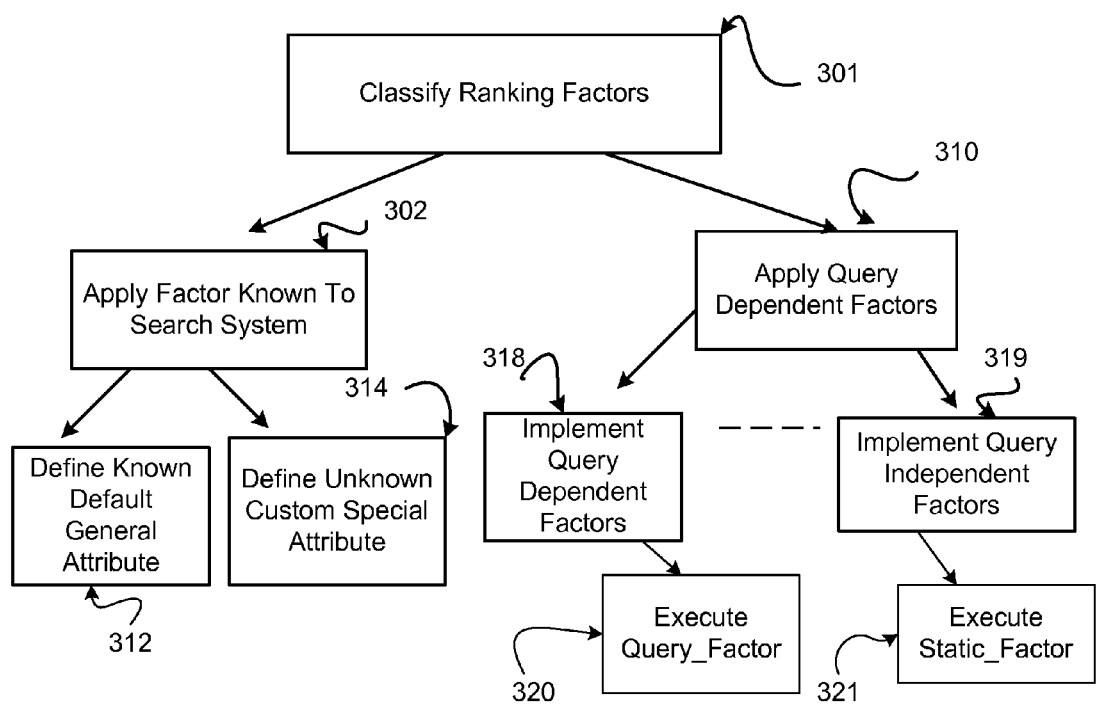
FIG. 3 is a ranking factors classification hierarchy defined as both a factor that is either known or unknown to the secure enterprise search system and a factor that is either dependent or independent with respect to a global setting query or a single instance query.

FIG. 3 further outlines an exemplary method to change ranking factor classifications 300 in accordance with one embodiment. First a user may classify ranking factors in a first ranking factor classification 301 as to whether it is known to the secure enterprise search system, and can apply factors that are known to the search system 302. Factors that are actually known to the secure enterprise search system are defined as default factors 312. Unknown factors to the secure enterprise search system are defined as custom factors 314, as discussed above.

In the second ranking factor classification, ranking factors are classified based on whether the effects of the ranking factors are dependent on the query, and if so query-dependent factors are applied 310. Actual query dependent ranking factors are implemented 322 and a query function executed 320, while query independent factors also can be implemented 319 and executed using a static factor function 321.

Figure 4:
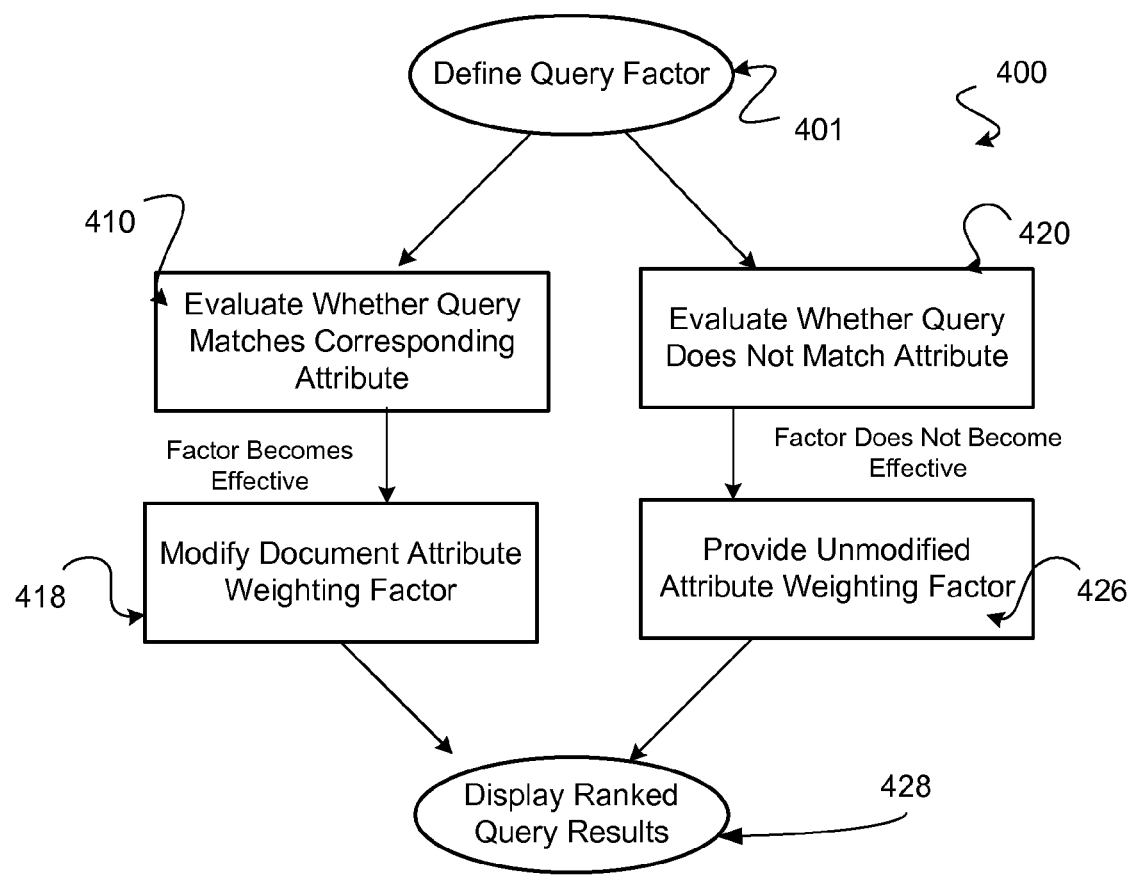
FIG. 4 illustrates a further aspect of the invention defined as a query factor and the related process for modifying a target source attribute weighting factor defined by a user accordingly.

FIG. 4 illustrates an exemplary method 400 for utilizing query factors where a query factor is defined 401 that will become effective only when the query matches the corresponding attribute 410. For example, if a user selects an attribute field in the query that matches the query dependent ranking factor, a query factor becomes effective a document attribute is modified 418 using a weighting ranking factor as previously discussed. If a particular query matches the corresponding attribute, the user will modify that particular document attribute weighting factor. In other words, when a user defines a query factor, the ranking algorithm will only modify those document attributes that match the user defined query document attribute. If the query does not match the attribute 420, then various factors will not become effective and thus will not be applied, whereby all other document attributes not defined will remain unmodified 426. The resulting modified and/or unmodified document attribute query factors will be utilized to change ranking algorithms which then are utilized to result in a ranked display of query results 428.

Figure 5:
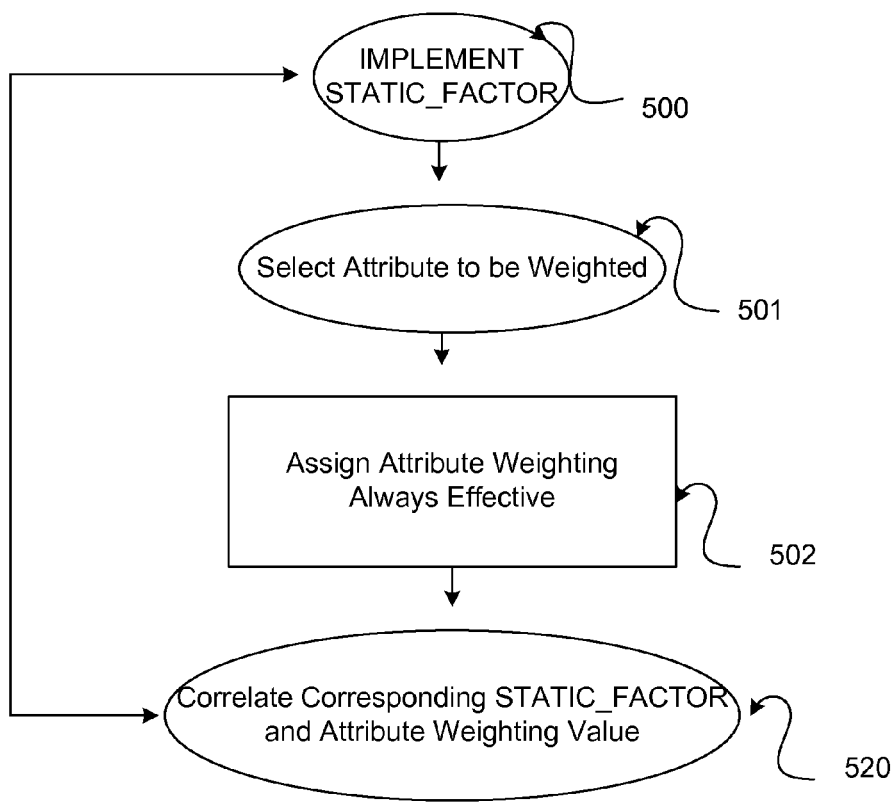
FIG. 5 illustrates a further aspect of the invention defined as a static factor and the related process for modifying a target source attribute weighting factor defined by a user accordingly.
Figure 6:
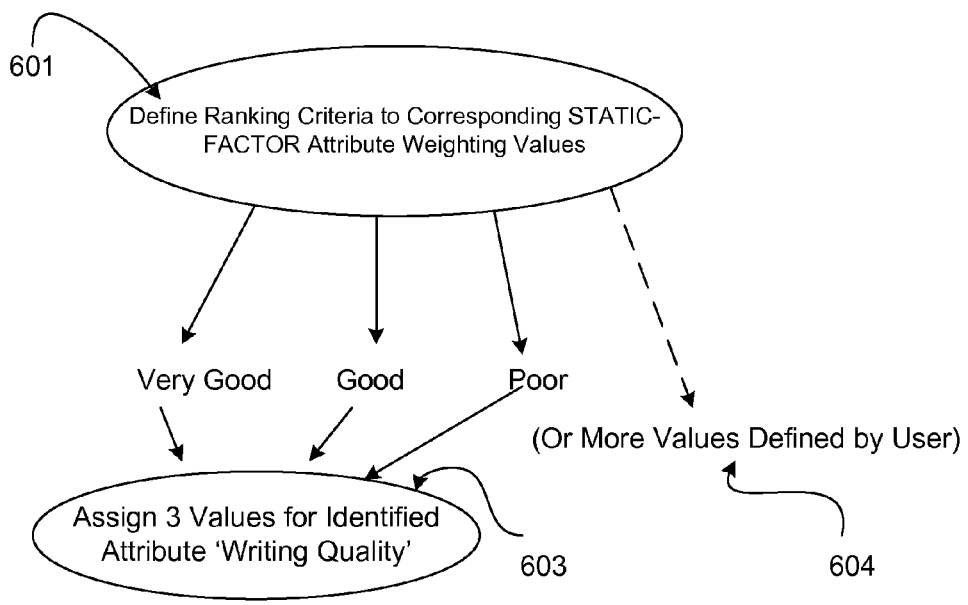
FIG. 6 further illustrates an exemplary implementation of a static factor.

Another exemplary method 500 for implementing a static factor 500 is illustrated in FIGS. 5 and 6. Here a static factor is implemented 510 with a selected attribute to be weighted 501 and an attribute weighting assigned that is always effective 502. The priority to the ranking function, however, will be based on the value of the corresponding document attribute, as the static factors are correlated with the corresponding attribute weighting values 520. For example, each document can be given a static value from 'VERY GOOD', 'GOOD', to 'POOR' based on 'writing quality' as illustrated in the method 600 illustrated in FIG. 6. In this case, the user can define ranking criteria for corresponding static factors 601. Here the name of static factor is 'writing quality' and it has three values: 'VERY GOOD', 'GOOD', and 'POOR', and these values are assigned for the writing quality attribute 603. Other single instances of the end user static factor modification may consist of additional values assigned by the user 604. Each value will correspond to a different weight based on the individual single instance preferences of the end user. Based on the value of a document writing quality, it will be treated differently in the ranking function algorithm according to the end user weight value assigned to 'writing quality'.

Figure 7:
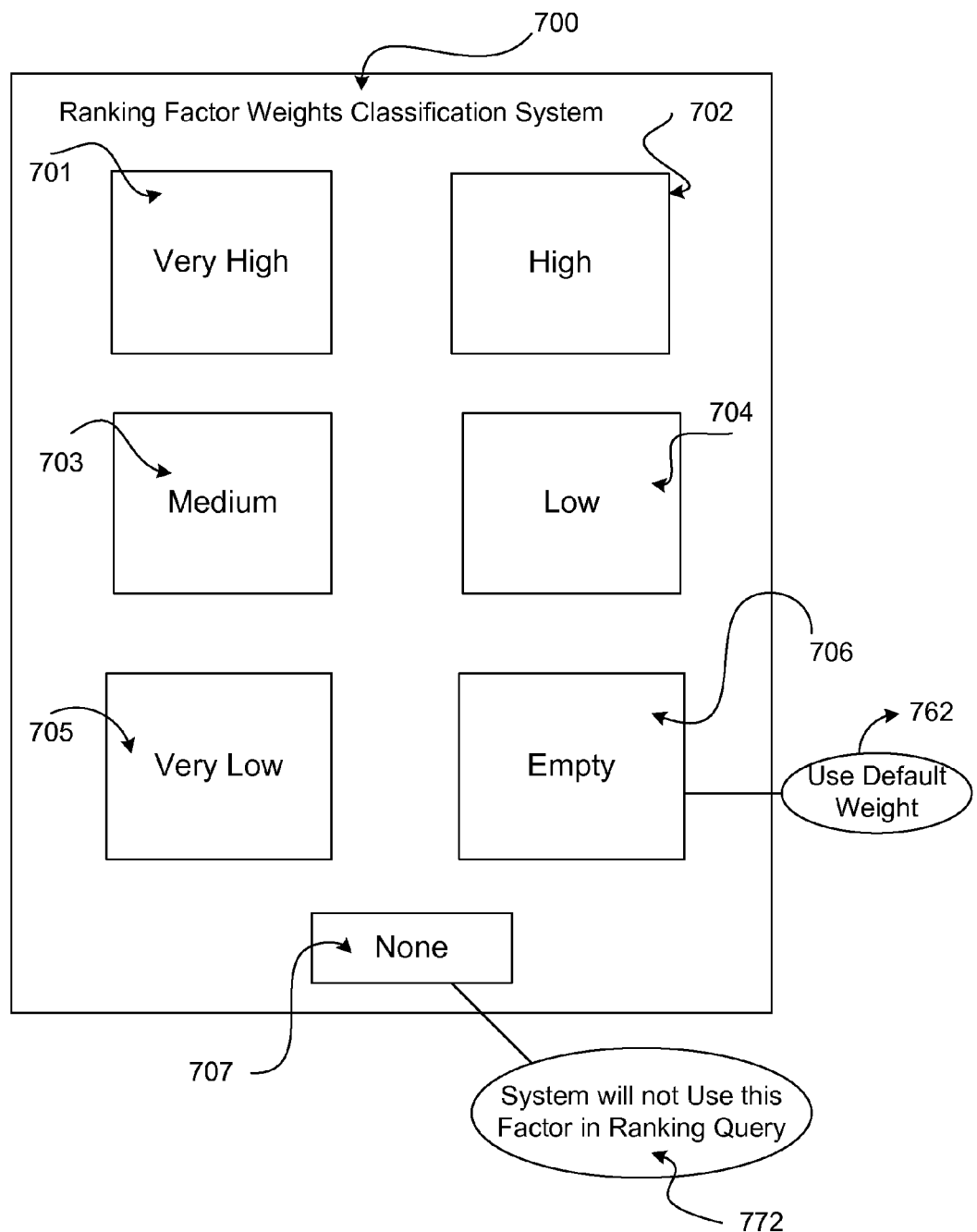
FIG. 7 illustrates a further aspect of the invention defined as a ranking factor value and the related process for classifying a weighted value based on seven classes.

According to yet another aspect of the present invention, ranking factor weights are classified into a seven class system 700 as shown in FIG. 7, including (empty) 706 which will use a default weight 762; NONE 707, where the system will not use this factor in ranking the query 772; VERY HIGH 701; HIGH 702; MEDIUM 703; LOW 704; and VERY LOW 705. When the values are from 'VERY LOW' to 'VERY HIGH', the corresponding ranking factor will be considered by the ranking function in a measured importance varying from very low to very high.

According to another aspect of the present invention, known default ranking factors only require an end user to specify ranking factor name and weight. FIG. 8 for example, illustrates how a user might implement the method with instructions in XML.

According to another aspect of the present invention, unknown custom ranking factors require an end user to define the type of ranking factor (query factor or static factor). For query factor, an end user only needs to specify ranking factor name, type and weights. For example in FIG. 9, code to illustrate how a user might implement the method is shown in XML.

According to another aspect of the present invention, for static factor, an end user needs to specify ranking factor name, type, the list of static values and corresponding weights. For example FIG. 10 illustrates how a user might implement the method in XML. The ranking factors specification can be set by customers to be effective for the whole search system, or the ranking factors specification can be submitted with each query and then impact ranking function differently for each query.

Figure 11:
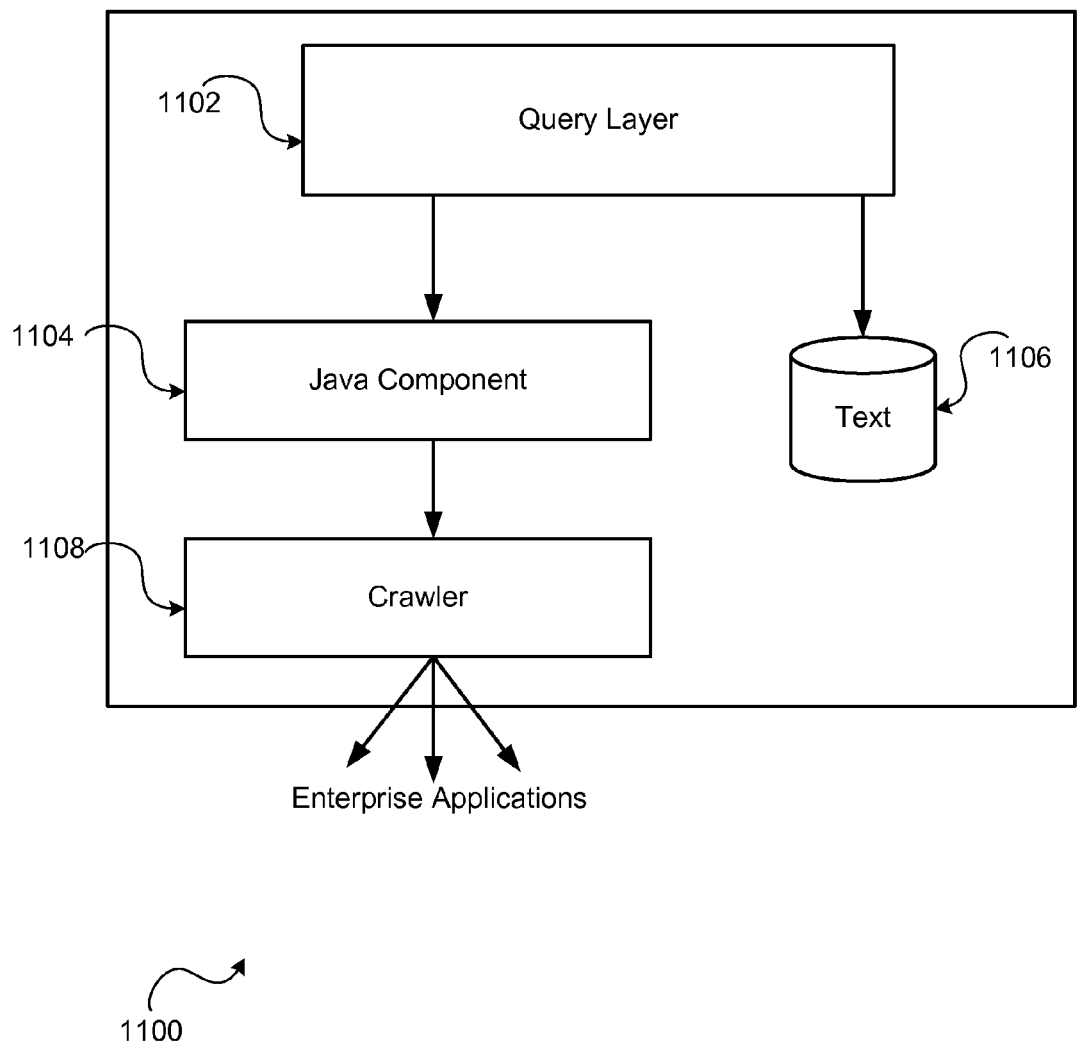
FIG. 11 illustrates an enterprise search system, client interface and a query layer to execute a change ranking algorithm system.

Changing ranking algorithms can be used advantageously in a secure enterprise search (SES) system. An exemplary SES system 1100 is illustrated in FIG. 11. An SES system can utilize the text index of a database 1106. In one embodiment, a database application accepts documents and generates the lists and other elements useful for text searching. An API allows a user to submit queries, such as text queries, to search documents based on, for example, keywords.

A query layer 1102 can be configured to receive queries from users, applications, entities, etc. These can be any appropriate queries, such as simple text queries entered through a search box or advanced queries. The query layer can convert a user query into the appropriate text queries, making sure security, authorization, authentication, and other aspects are addressed, such that the results are returned to the user based on what the user is allowed to access across the enterprise. In one embodiment, the query layer can communicate with a Java component 1104 to communicate with a crawler 1108 that is able to crawl various enterprise applications, enterprise documents, enterprise objects, etc. This approach can be referred to as secure enterprise search, as an Internet search or other such searches typically are done only for public documents using more rigid queries. SES can also allow for searching of public documents, but when accessing secure content SES can ensure that only authorized persons are able to retrieve that content.

A secure enterprise search (SES) system, such as the Oracle® Secure Enterprise Search product from Oracle Corporation of Redwood Shores, Calif., can provide a simple yet powerful way to search data across an enterprise. An SES system can crawl and index any content and return relevant results in a way that is familiar to users, such as is returned for typical Internet-based search results. SES also can provide a query service API, for example, that can easily be plugged into various components in order to obtain a search service for those component.

A SES system can utilize the text index of a database. In one embodiment, a database application accepts documents and generates the lists and other elements useful for text searching. An API allows a user to submit queries, such as text queries, to search documents based on, for example, keywords.

A query layer can be configured to receive queries from users, applications, entities, etc. These can be any appropriate queries, such as simple text queries entered through a search box or advanced queries. The query layer can convert a user query into the appropriate text queries, making sure security, authorization, authentication, and other aspects are addressed, such that the results are returned to the user based on what the user is allowed to access across the enterprise. This approach can be referred to as secure enterprise search, as an Internet search or other such searches typically are done only for public documents using more rigid queries. SES can also allow for searching of public documents, but when accessing secure content SES can ensure that only authorized persons are able to retrieve that content.

Exemplary Operating Environments, Components, and Technology

Figure 12:
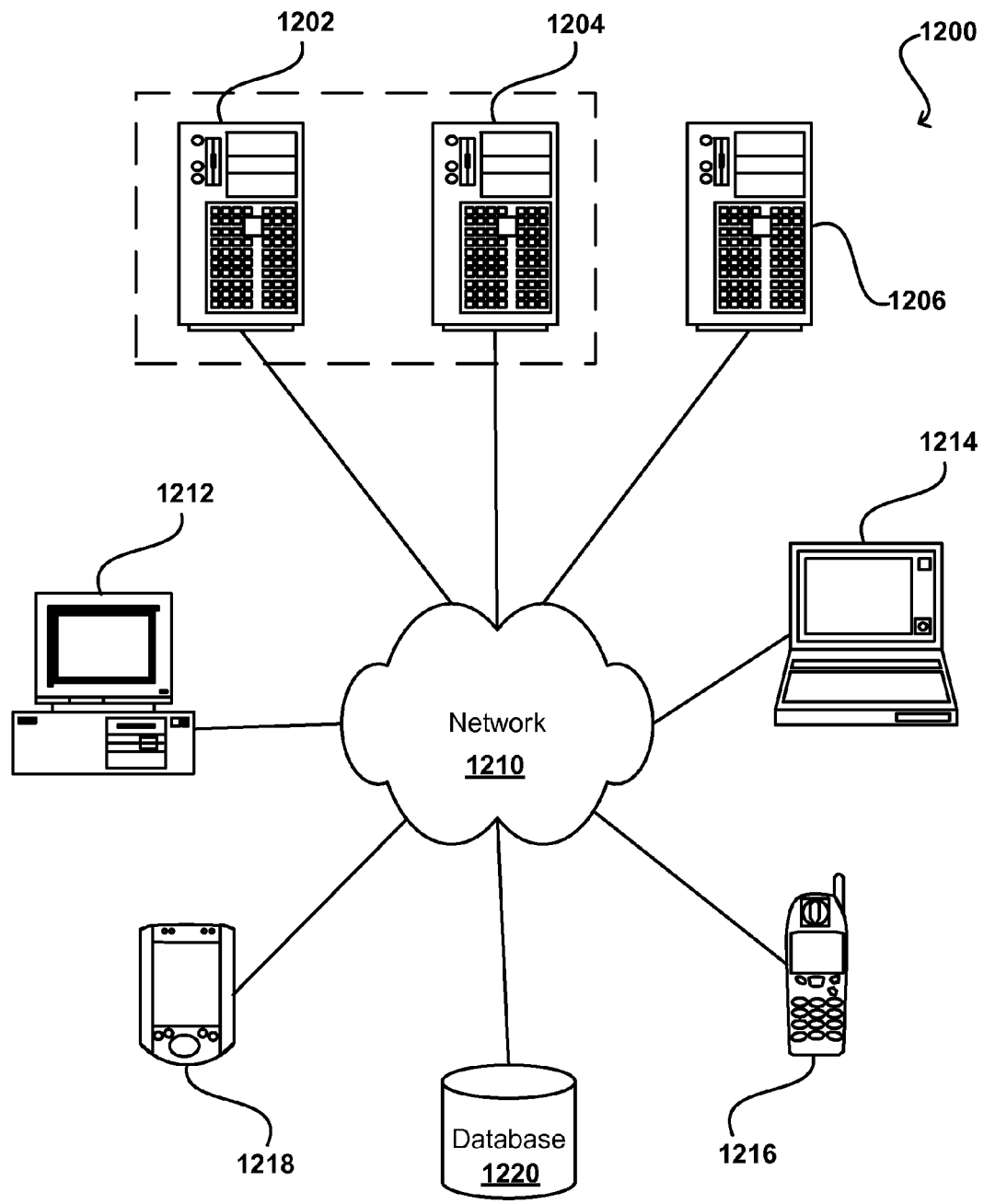
FIG. 12 illustrates components of a computer network that can be used in accordance with one embodiment of the present invention.
Figure 13:
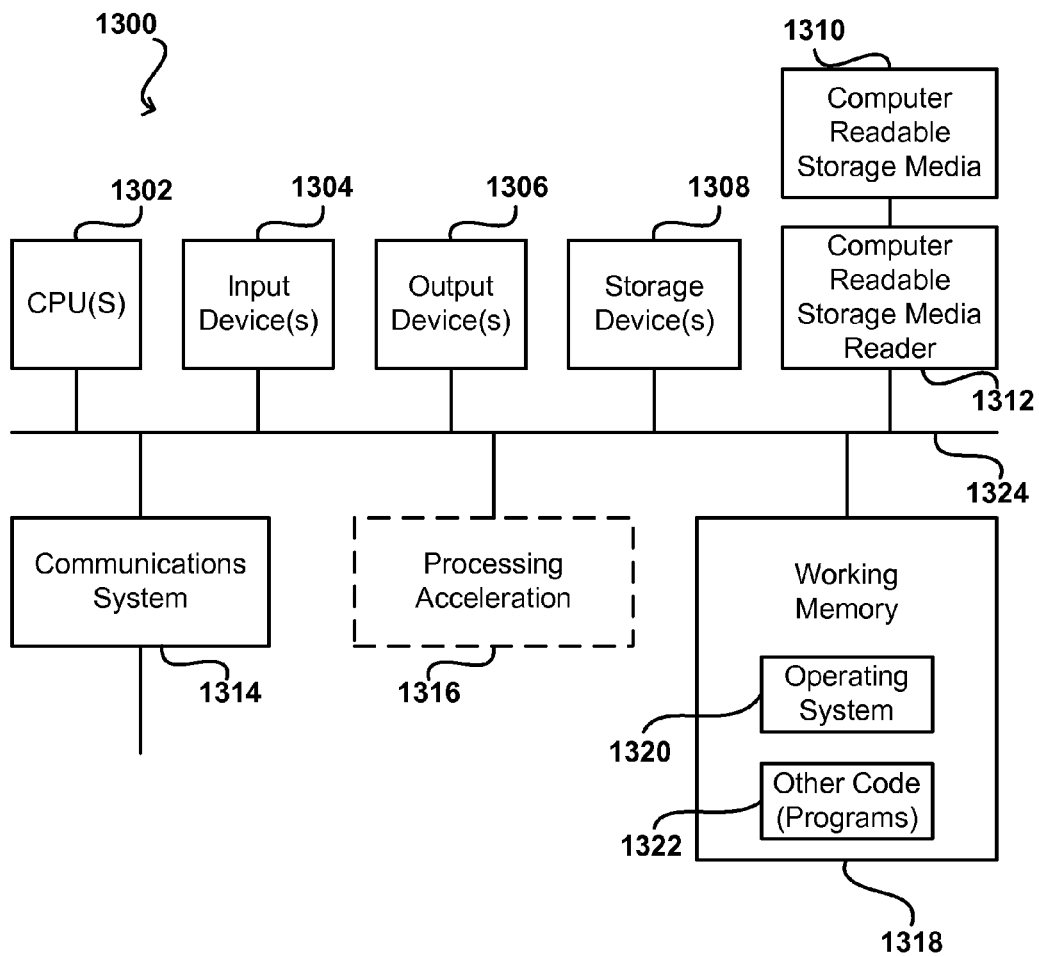
FIG. 13 illustrates components of a computer network that can be used in accordance with one embodiment of the present invention.

FIG. 12 is a block diagram illustrating components of an exemplary operating environment in which embodiments of the present invention may be implemented. The system 1200 can include one or more user computers, computing devices, or processing devices 1212, 1214, 1216, 1218, which can be used to operate a client, such as a dedicated application, web browser, etc. The user computers 1212, 1214, 1216, 1218 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1212, 1214, 1216, 1218 may also have any of a variety of applications, including one or more development systems, database client and/or server applications, and Web browser applications. Alternatively, the user computers 1212, 1214, 1216, 1218 may be any other electronic device, such as a thin-client computer, Internet-enabled gaming system, and/or personal messaging device, capable of communicating via a network (e.g., the network 1210 described below) and/or displaying and navigating Web pages or other types of electronic documents. Although the exemplary system 1200 is shown with four user computers, any number of user computers may be supported.

In most embodiments, the system 1200 includes some type of network 1210. The network can be any type of network familiar to those skilled in the art that can support data communications using any of a variety of commercially-available protocols, including without limitation TCP/IP, SNA, IPX, AppleTalk, and the like. Merely by way of example, the network 1210 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1202, 1204, 1206 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1206) may be dedicated to running applications, such as a business application, a Web server, application server, etc. Such servers may be used to process requests from user computers 1212, 1214, 1216, 1218. The applications can also include any number of applications for controlling access to resources of the servers 1202, 1204, 1206.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1212, 1214, 1216, 1218. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1212, 1214, 1216, 1218.

The system 1200 may also include one or more databases 1220. The database(s) 1220 may reside in a variety of locations. By way of example, a database 1220 may reside on a storage medium local to (and/or resident in) one or more of the computers 1202, 1204, 1206, 1212, 1214, 1216, 1218. Alternatively, it may be remote from any or all of the computers 1202, 1204, 1206, 1212, 1214, 1216, 1218, and/or in communication (e.g., via the network 1210) with one or more of these. In a particular set of embodiments, the database 1220 may reside in a storage-area network ("SAN") familiar to those skilled in the art. Similarly, any necessary files for performing the functions attributed to the computers 1202, 1204, 1206, 1212, 1214, 1216, 1218 may be stored locally on the respective computer and/or remotely, as appropriate. In one set of embodiments, the database 1220 may be a relational database, such as Oracle 10 g, that is adapted to store, update, and retrieve data in response to SQL-formatted commands.

FIG. 12 illustrates an exemplary computer system 1300, in which embodiments of the present invention may be implemented. The system 1300 may be used to implement any of the computer systems described above. The computer system 1300 is shown comprising hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). The computer system 1300 may also include one or more storage devices 1308. By way of example, the storage device(s) 1308 can include devices such as disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1312, a communications system 1314 (e.g., a modem, a network card (wireless or wired), an infra-red communication device, etc.), and working memory 1318, which may include RAM and ROM devices as described above. In some embodiments, the computer system 1300 may also include a processing acceleration unit 1316, which can include a digital signal processor DSP, a special-purpose processor, and/or the like.

The computer-readable storage media reader 1312 can further be connected to a computer-readable storage medium 1310, together (and, optionally, in combination with storage device(s) 1308) comprehensively representing remote, local, fixed, and/or removable storage devices plus storage media for temporarily and/or more permanently containing, storing, transmitting, and retrieving computer-readable information. The communications system 1314 may permit data to be exchanged with the network and/or any other computer described above with respect to the system 1300.

The computer system 1300 may also comprise software elements, shown as being currently located within a working memory 1318, including an operating system 1320 and/or other code 1322, such as an application program (which may be a client application, Web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for ranking search results using user preferences, the method comprising:
    obtaining a set of custom ranking factors which specify document attributes to be applied to search results for a query;
    for each of the custom ranking factors, defining a type of the custom ranking factor;
    receiving a user-supplied weight from a user for each of the set of custom ranking factors which specify document attributes;
    generating, using a processor operatively coupled to a memory, a ranking algorithm that is a combination function of the set of custom ranking factors which specify document attributes based on the user-supplied weights for the ranking factors and the type of the custom ranking factors;
    applying the ranking algorithm to search results for the query; and
    displaying the search results ranked according to the ranking algorithm.

2. The method for ranking search results using user preferences of claim 1, further comprising using a first classification for each of the ranking factors based on whether the ranking factors are default factors.

3. The method for ranking search results using user preferences of claim 2, further comprising using a second classification for each of the ranking factors based on whether the ranking factors depend upon the user query.

4. The method for ranking search results using user preferences of claim 3, wherein ranking factors that depend on the query are classified as query factors.

5. The method for ranking search results using user preferences of claim 3, wherein ranking factors that are independent of the query are classified as static factors.

6. The method for ranking search results using user preferences of claim 1, wherein within the obtaining of the set of custom ranking factors which specify document attributes to be applied to search results for a query is within a heterogeneous enterprise environment.

7. The method for ranking search results using user preferences of claim 1, wherein the type of the ranking factor comprises a query factor or a static factor.

8. The method for ranking search results using user preferences of claim 7, wherein the document attributes comprise a combination function of the ranking factors which specify document attributes based on the user-supplied weights for the ranking factors and the type of the custom ranking factors.

9. The method for ranking search results using user preferences of claim 1, wherein at least one of the obtained ranking factors is active in the ranking algorithm if terms in the query match a value of the at least one ranking factor.

10. The method of claim 1, wherein the generating the ranking algorithm is performed when the query is received from the user.

11. The method for ranking search results using user preferences of claim 1, further comprising applying the first ranking factor to the search results based on the type of ranking factor and based on whether an attribute for a document matches the query.

12. A non-transitory computer-readable medium for ranking search results using user preferences having sets of instructions stored thereon which, when executed by a computer, cause the computer to:
    obtain a set of custom ranking factors which specify document attributes to be applied to search results for a query;
    for each of the custom ranking factors, define a type of the custom ranking factor;
    receive a user-supplied weight from a user for each of the set of custom ranking factors which specify document attributes;
    generate a ranking algorithm that is a combination function of the set of custom ranking factors which specify document attributes based on the user-supplied weights for the ranking factors and the type of the custom ranking factors;
    apply the ranking algorithm to search results for the query; and
    display the search results ranked according to the ranking algorithm.

13. The non-transitory computer-readable medium for ranking search results using user preferences of claim 12, wherein the sets of instructions when further executed by the computer, cause the computer to use a first classification for each of the ranking factors based on whether the ranking factors are default factors.

14. The non-transitory computer-readable medium for ranking search results using user preferences of claim 13, wherein the sets of instructions when further executed by the computer, cause the computer to use a second classification for each of the ranking factors based on whether the ranking factors depend upon the user query.

15. The non-transitory computer-readable medium for ranking search results using user preferences of claim 14, wherein ranking factors that depend on the query are classified as query factors.

16. The non-transitory computer-readable medium for ranking search results using user preferences of claim 14, wherein ranking factors that are independent of the query are classified as static factors.

17. A system for ranking search results using user preferences, the system comprising:

a storage medium; and a processor coupled to the storage medium, wherein the storage medium includes sets of instructions which, when executed by the processor, cause the processor to:

obtain a set of custom ranking factors which specify document attributes to be applied to search results for a query, for each of the custom ranking factors, define a type of the custom ranking factor, receive a user-supplied weight from a user for each of the set of custom ranking factors which specify document attributes, generate a ranking algorithm that is a combination function of the set of custom ranking factors which specify document attributes based on the user-supplied weights for the ranking factors and the type of the custom ranking factors, apply the ranking algorithm to search results for the query, and display the search results ranked according to the ranking algorithm.

18. The system for ranking search results using user preferences of claim 17, wherein the sets of instructions when executed further cause the processor to use a first classification for each of the ranking factors based on whether the ranking factors are default factors.

19. The system for ranking search results using user preferences of claim 18, wherein the sets of instructions when executed further cause the processor to use a second classification for each of the ranking factors based on whether the ranking factors depend upon the user query.

20. The system for ranking search results using user preferences of claim 19, wherein ranking factors that depend on the query are classified as query factors and ranking factors are independent of the query are classified as static factors.

* * * * *

UNITED STATES PATENT AND TRADEMARK OFFICE
CERTIFICATE OF CORRECTION

PATENT NO. : 8,412,717 B2  
APPLICATION NO. : 13/169688  
DATED : April 2, 2013  
INVENTOR(S) : Liao et al.

Page 1 of 1

It is certified that error appears in the above-identified patent and that said Letters Patent is hereby corrected as shown below:

In the Drawings:

On sheet 8 of 11, in figure 10, line 1, delete "STATC_FACTOR" and insert -- STATIC_FACTOR --, therefor.

In the Specifications:

In column 6, line 28, delete "environment." and insert -- environment --, therefor.

In column 10, line 17, delete "10 g," and insert -- 10g, --, therefor.

Signed and Sealed this
Ninth Day of July, 2013

Teresa Stanek Rea
*Acting Director of the United States Patent and Trademark Office*